United States Patent [19]

Kobale et al.

[11] Patent Number: 4,613,399

[45] Date of Patent: Sep. 23, 1986

[54] METHOD FOR MANUFACTURING A DISPLAY DEVICE

[75] Inventors: Manfred Kobale, Faistenhaar; Günter Trausch; Rolf Wengert, both of Munich, all of Fed. Rep. of Germany

[73] Assignee: Siemens Aktiengesellschaft, Berlin and Munich, Fed. Rep. of Germany

[21] Appl. No.: 670,374

[22] Filed: Nov. 9, 1984

[30] Foreign Application Priority Data

Nov. 15, 1983 [DE] Fed. Rep. of Germany ....... 3341397

[51] Int. Cl.[4] ........................... C23F 1/02; B44C 1/22; C03C 15/00; C03C 25/06

[52] U.S. Cl. .................................... 156/634; 156/656; 156/659.1; 313/491

[58] Field of Search ........ 156/629, 630, 633, 634–656, 156/659.1, 664, 89; 313/484, 485, 491, 493, 348; 204/15

[56] References Cited

U.S. PATENT DOCUMENTS

| | | | |
|---|---|---|---|
| 4,112,329 | 9/1978 | Veith | 313/491 |
| 4,293,376 | 10/1981 | Weingand | 156/644 |
| 4,340,838 | 7/1982 | Kobale et al. | 313/348 |
| 4,404,060 | 9/1983 | Trausch | 156/632 |

*Primary Examiner*—William A. Powell
*Attorney, Agent, or Firm*—Herbert L. Lerner; Laurence A. Greenberg

[57] ABSTRACT

Producing a glass solder seal without interfering thermal stresses in a display device containing at least two mutually parallel plates tightly connected at the edges via a frame. One plate is coated with a pattern of separately addressable electrodes which are each brought to the outsides through the frame. The method includes (a) also covering the electrode pattern in the region provided for the frame, (b) covering the such feedthrough region with a second mask which is later removed, and (c) using a frame made of glass solder.

13 Claims, 6 Drawing Figures

METHOD FOR MANUFACTURING A DISPLAY DEVICE

BACKGROUND OF THE INVENTION

1. Field of the Invention This invention relates to a method for manufacturing a display device containing at least two mutually parallel plates which are connected tightly at their edges via a frame, and to the manufactured display device. At least one plate is coated with a pattern of separately addressable electrodes which are each brought to the outside through the frame.

2. Description of the Prior Art

German Published Non-Prosecuted Application No. DE-OS 29 31 077 (U.S. Pat. No. 4,340,838) describes a flat picture screen in a gas discharge display device in which a gas discharge furnishes electrons which are drawn through selected holes of a control matrix into a space free of plasma, wherein energies of several kV are absorbed and finally strike a fluorescent screen. The control matrix is formed by individually addressable row and column conductors which are arranged on both sides of an insulating plate and are preferably generated as follows: First, an adhesion-promoting aluminum oxide layer 20 nm thick is vapor-deposited on the plate and this is followed with a vapor deposited copper conduction layer 300 nm thick. This metallization is subsequently given a photoresist mask which leaves only the desired electrode patterns free. The bare copper regions are reinforced by electroplating, more specifically, first, with copper 3 μm thick for improving the conductivity and thereafter, with 1 μm nickel as corrosion and sputter protection. Thereupon, the resist is removed and the exposed titanium/copper areas are etched off.

In order to build up a gastight envelope with such an electrode plate, all cell parts to be connected together (plates and optionally required spacer frames) could be made of glass and fused to each other (see in this connection DE-OS No. 26 15 721 corresponding to U.S. Pat. No. 4,112,329 which is referred to in DE-OS No. 29 31 077, which corresponds to U.S. Pat. No. 4,340,838). Such fusing technique, however, can be considered only in exceptional cases if only for the reason that they require conductor and insulating materials which are extremely heat-resistant.

An ideal situation would be one in which the glass parts could be solidified with each other by a low-melting glass solder. Practice has shown, however, that leaks and cracks in the plates always occur in the vicinity of the glass solder seam. These defects are probably related to the fact that glass adheres poorly on nickel; that nickel itself is not particularly ductile; and the entire soldering zone is subjected to strong thermal stresses after cooling off. Nickel is not replaceable without difficulty, especially since it can be very conveniently deposited electrolytically. In any case, the wettability could be improved substantially with a specific surface oxidation. Such oxidation, however, is not always successful and is in addition very costly because the conductors must remain bare in the vicinity of the display panel where surface oxides would lead to contrast variations.

SUMMALRY OF THE INVENTION

An object of the invention is to modify a method of the type mentioned at the outset to produce a glass solder seal without interfering thermal stresses in a simple manner.

With the foregoing and other objects in view, there is provided in accordance with the invention a method for manufacturing a display device containing at least two mutually parallel plates which are connected tightly at the edges via a frame, and at least one parallel plate coated with a pattern of separately addressable electrodes with each electrode brought through the frame to the outside of the frame, which comprises:

(1a) applying a metallic adhesion layer <0.1 μm thick to the plate to be coated by a vacuum techniques, (b) applying a metallic conductor layer <1 μm thick to the adhesion layer by a vacuum technique, (c) covering with a first mask at least the adhesion and conducting layer zone outside the electrode pattern which outside layer zone is designated residual zone, (1c') also covering with the first mask, the electrode pattern in the region provided for the frame designated feeedthrough region, (2a) reinforcing the conducting layer in its region left free by the first mask, by applying by electroplating at least one layer, in which the topmost layer of the reinforcement is >1 μm thick and consists of nickel, (b) removing the first mask (2c) covering the feedthrough region with a second mask, (3a) etching off the adhesion layer and the conducting layer in the residual zone, (3b) removing the second mask, and (4a) placing one of the plates in the frame, (4a') wherein the frame is a glass solder, (b) placing the other plate above the plate in the frame, and (c) connecting both plates to each other at an elevated temperature.

In accordance with the foregoing, there is provided a display device characterized by the features that it contains a gas-tight envelope with wall plates parallel to each other; a control structure is between these two wall plates which subdivides the interior of the envelope into a rear space designated a gas discharge space and a front space designated a post-acceleration space and comprises at least one plate designated control plate coated with an electrode pattern; the control plate carries row conductors on its back side and on its front side column conductors of a control matrix and said control plate is perforated together with its conductors at each conductor crossing; the back plate is provided with at least one cathode; the front plate carries a post-acceleration anode and a raster of phosphor dot, identical with the opening pattern; and means for applying a high voltage larger than 1 kV in the post-acceleration space between the frontmost electrode plane of the control structure and the post-acceleration anode, that in operation, a gas discharge burns between the cathode and one of the row conductors.

Other features which are considered as characteristic for the invention are set forth in the appended claims.

Although the invention is illustrated and described herein as embodied in a method for manufacturing a display device and display device manufactured accordingly, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

The proposed solution to the problem of obtaining a suitable glass solder seal in a display device starts out from the observation that the described drawbacks can also be traced to the fact that the end layer is underetched in the (wet-chemical) removal of the layers underneath it and thereby, spaces are generated which cannot always be filled out completely by the printed-on glass solder paste. If now, as provided according to the invention, the conductors remain unreinforced in the glass solder zone, all causes for the development of leaks and cracks are eliminated. The not reinforced electrode sections, in addition, have a very exact structure because they are generated by photolithography, with a photoresist as an etching reserve. This means that every conductor has a defined resistance and a defined resistance in its critical feedthrough part. This series resistance is not particularly high; the layers applied by vacuum techniques, i.e. by vapor deposition or sputtering, contribute to the conductivity of the electrode relatively more than the less dense and more contaminated electroplated layers, and does not load the addressing circuit significantly. If required, the feedthrough resistance could further be lowered without additional effort, for instance by making the adhesion and conduction layer wider in its unreinforced section.

Normally, the electroplated reinforcement need be interrupted only for a short distance within the frame, for instance on one third of the frame width. Such a geometry is sufficient for tight soldering without fracture and furthermore functions to cover the oxidation-sensitive electrode parts by the frame and therefore protects against uncontrolled degradation of the small series resistance.

The best results are obtained by using a vapor-deposited adhesion layer between 20 nm and 40 nm thick and preferably consisting of Ti, a vapor-deposited copper conduction layer with a thickness of between 400 nm and 900 nm, an electroplated-on copper layer between 1 $\mu$m and 2 $\mu$m thick and a final Ni layer between 3 $\mu$m and 5 $\mu$m thick as well as soft glass plates with a thermal coefficient of expansion between $80\times10^{7}$°$K^{-1}$ and $100\times10^{-7}$°$K^{-1}$.

If the plates are mechanically stable, one can work with (negative) dry resist. For fragile plates or perforated plates with metallic overhang in the region of the holes, (positive) liquid resists should rather be considered.

The invention will now be explained in greater detail with the aid of an embodiment example, referring to the attached drawings. In the figures of the drawings, corresponding parts are provided with the same reference symbols.

Figure 1:
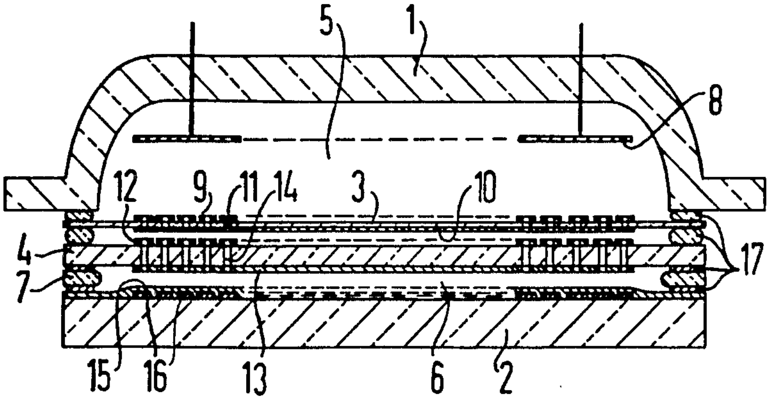
FIG. 1 shows in a simplified lateral cross section a flat picture screen according to the invention, and FIGS. 2-6 each show a process step in the manufacture of the control plate shown in FIG. 1.

The display device of FIG. 1 contains a vacuum envelope with a tray-like rear part 1 and a front plate 2. The interior of the envelope is subdivided by a control structure of a control plate 3 and a carrier plate 4, into a backward gas-discharge space 5 and a frontward post-acceleration space 6. The distance between the carrier plate and the front plate is defined by a spacer frame 7. The tray-like rear part 1 is provided with a number of strip-shaped mutually parallel cathodes 8. Each cathode is brought through the bottom of the tray 1. The control plate 3 carries on its back side row conductors 9 which are parallel to the cathode, and column conductors 10 at the front. These conductors form a control matrix with individually addressable elements, in which the matrix conductors and the plate are perforated (openings 11). The carrier plate 4 is coated on its back side with strip conductors 12 parallel to the row conductors 9 and coated on its front side with a continuous electrode 13. This electrode plate is also perforated (canals 14), specifically, in a pattern identical with the hole raster of the control plate 3. The front plate 2 is coated on the back side with a post-acceleration anode 15 extending over the whole surface and has phosphor dots 16 each of which is arranged in front of one of the canals 14. All plates and the rear part are connected to each other via glass solder frames 17 hermetically sealed.

Figure 2:
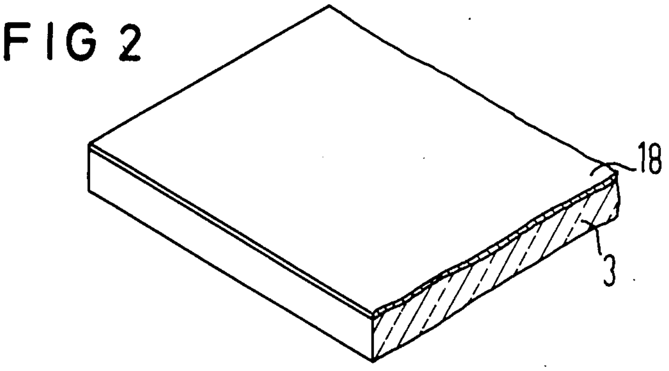
Figure 3:
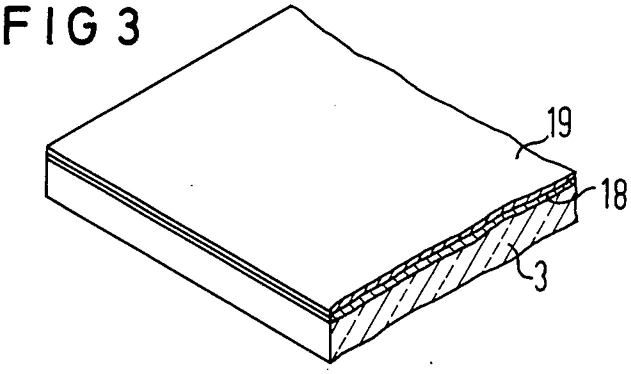
Figure 4:
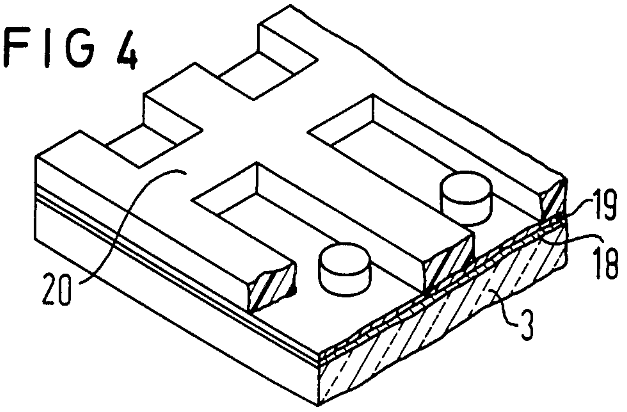
Figure 5:
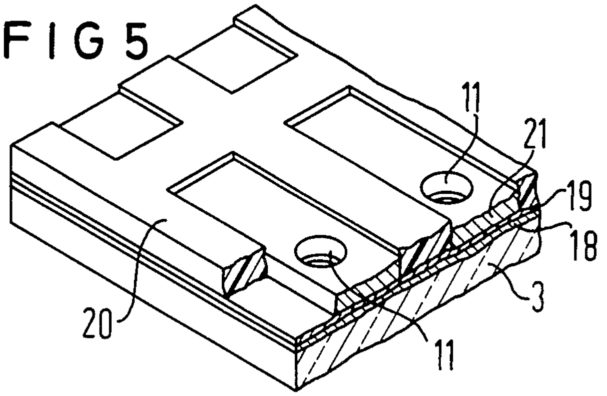
Figure 6:
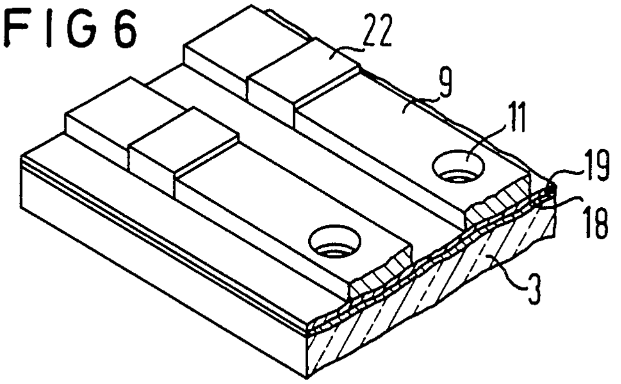

The control plate 3 is fabricated as follows: A soft-glass plate, approximately 0.15 mm thick, having a thermal expansion coefficient of approximately $90\times10^{-7}$°$K-1$ is first vapor-deposited with a titanium/titanium oxide layer 18 of 30 nm thickness and subsequently with a copper layer 19 of 800 nm thickness (FIGS. 2 and 3). Then, a photoresist mask 20 is prepared which leaves the electrode pattern, which in the present case are perforated strips, in a raster of $0.32\times0.40$ $nm^2$ except for the frame sections (FIG. 4). In the mask windows, the metallization is reinforced by electroplating, first with copper 1.2 $\mu$m thick and then with nickel by a further 4 $\mu$m. Then, the mask is stripped off where the glass is to be given holes, and the metallization and the glass are etched away there. A structure shown in FIG. 5 is produced, in this figure, the electroplate-on Cu and Ni layers are combined in one layer 21. Thereupon, the residues of the mask are lifted off and the frame sections of the conductors are covered with a further mask 22, and specifically on a length of 3 mm and a width of 0.20 mm or 0.28 mm (FIG. 6). Then, the metallization remaining between the conductors is etched away, and a completely structured control plate is obtained. For further details of manufacturing, reference is made to German Patent No. 28 02 976 (U.S. Pat. No. 4,293,376).

The carrier plate 4 which consists of photo-etchable glass about 0.7 mm thick is processed according to a modified method. The main difference is that the plate is given its breakthroughs first and is then coated. The procedure which is most efficient here is described in German DE-OS No. 31 18 335 (U.S. Pat. No. 4,404,060).

When all plates are completed, they are printed at the points provided therefor with a glass solder paste. The solder mass covers all unreinforced conductor sections and is of such a nature that the final glass solder frame has a width of 9 mm. Subsequently, the solder is dried, the cell parts are assembled in their proper position and the soldering is carried out at approximately 425° C.

The invention is not limited only to the embodiment example shown. Thus, the manner in which the electrons are generated does not matter, accordingly, the longitudinal plasma could be replaced by a transverse discharge or a hot cathode. Ni-reinforced electrodes and a glass solder technique, if applicable may be utilized in other (active and passive) display types. Apart from that, the electrodes may also be patterned differently than in a line matrix, may form more or fewer planes and/or may be of a different nature under its end layer. Thus, for instance, adhesion layers of Cr or glass, conducting layers of Ag and electroplated coatings consisting exclusively of Ni may sometimes be employed.

The foregoing is a description corresponding, in substance, to German application No. P 33 41 397.5, dated Nov. 15, 1983, international priority of which is being claimed for the instant application, and which is hereby made part of this application. Any material discrepancies between the foregoing specification and the specification of the aforementioned corresponding German application are to be resolved in favor of the latter.

There is claimed:

1. A method for manufacturing a display device containing at least two mutually parallel plates which are connected tightly at the edges via a frame, and at least one parallel plate coated with a pattern of separately addressable electrodes with each electrode brought through the frame to the outside of the frame, which comprises:

(1a) applying a metallic adhesion layer $<0.1\ \mu m$ thick to the plate to be coated by a vacuum techniques, (b) applying a metallic conductor layer $<1\ \mu m$ thick to the adhesion layer by a vacuum technique, (c) covering with a first mask at least the adhesion and conducting layer zone outside the electrode pattern which outside layer zone is designated resisdual zone, (1c') also covering with the first mask, the electrode pattern in the region provided for the frame designated feedthrough region, (2a) reinforcing the conducting layer in its region left free by the first mask, by applying by electroplating at least one layer, in which the topmost layer of the reinforcement is $>1\ \mu m$ thick and consists of nickel, (b) removing the first mask (2c) covering the feedthrough region with a second mask, (3a) etching off the adhesion layer and the conducting layer in the residual zone, (3b) removing the second mask, and (4a) placing one of the plates in the frame, (4a') wherein the frame is a glass solder, (b) placing the other plate above the plate in the frame, (c) connecting both plates to each other at an elevated temperature.

2. Method according to claim 1, wherein the adhesion layer and the conducting layer are vapor deposited.

3. Method according to claim 1, wherein titanium or titanium oxide is used for the adhesive layer and this layer is made between 20 nm and 40 nm thick.

4. Method according to claim 2, wherein titanium or titanium oxide is used for the adhesive layer and this layer is made between 20 nm and 40 nm thick.

5. Method according to claim 1, wherein copper is used for the conducting layer and this layer is made between 40 nm and 900 nm thick.

6. Method according to claim 3, wherein copper is used for the conducting layer and this layer is made between 40 nm and 900 nm thick.

7. Method according to claim 1, wherein the conducting layer is first reinforced by electroplating with copper of a thickness betweem 0.9 $\mu m$ and 1.5 $\mu m$ and then with nickel of a thickness between 2.5 $\mu m$ and 5 $\mu m$.

8. Method according to claim 5, wherein the conducting layer is first reinforced by electroplating with copper of a thickness between 0.9 $\mu m$ and 1.5 $\mu m$ and then with nickel of a thickness between 2.5 $\mu m$ and 5 $\mu m$.

9. Method according to claim 6, wherein the conducting layer is first reinforced by electroplating with copper of a thickness between 0.9 $\mu m$ and 1.5 $\mu m$ and then with nickel of a thickness between 2.5 $\mu m$ and 5 $\mu m$.

10. Method according to claim 1, wherein the feedthrough area is covered with the second mask to a width b which is smaller than the width B of the glass solder frame, and the glass solder mass is allowed to extend inward and outward beyond the feedthrough region.

11. Method according to claim 10, wherein the following applies:

$$\tfrac{1}{4} \leqq b/B \leqq \tfrac{1}{2}.$$

12. Method according to claim 1, wherein a glass is used for the plates with a thermal expansion coefficient for which the following applies:

$$80\times 10^{-7}\,{}^{\circ}K^{-1} \leqq |\alpha \leqq 100\times 10^{-7}\,{}^{\circ}K^{-1}.|$$

13. Method according to claim 1, wherein a glass is used for the plates with a thermal expansion coefficient for which the following applies:

$$87\times 10^{-7}\,{}^{\circ}K^{-1} \leqq \alpha \leqq 93\times 10^{-7}\,{}^{\circ}K^{-1}.$$

* * * * *